US008184828B2

(12) United States Patent
Christoph

(10) Patent No.: US 8,184,828 B2

(45) Date of Patent: May 22, 2012

(54) BACKGROUND NOISE ESTIMATION UTILIZING TIME DOMAIN AND SPECTRAL DOMAIN SMOOTHING FILTERING

(75) Inventor: Markus Christoph, Straubing (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 199 days.

(21) Appl. No.: 12/729,839

(22) Filed: Mar. 23, 2010

(65) Prior Publication Data

US 2010/0239098 A1 Sep. 23, 2010

(30) Foreign Application Priority Data

Mar. 23, 2009 (EP) ..................................... 09155895

(51) Int. Cl.
*H04B 15/00* (2006.01)
*H04R 29/00* (2006.01)

(52) U.S. Cl. ........................................ 381/94.2; 381/56

(58) Field of Classification Search .................... 381/56, 381/57, 59, 94.1, 94.2, 94.3, 94.7, 96, 71.11; 375/232
See application file for complete search history.

(56) References Cited

U.S. PATENT DOCUMENTS

| | | | | |
|---|---|---|---|---|
| 5,179,575 | A * | 1/1993 | Pierce et al. | 375/232 |
| 2004/0101038 | A1* | 5/2004 | Etter | 375/222 |
| 2007/0076791 | A1* | 4/2007 | DiFazio et al. | 375/229 |
| 2009/0063143 | A1 | 3/2009 | Christoph | |
| 2009/0097676 | A1* | 4/2009 | Seefeldt | 381/107 |
| 2009/0129493 | A1* | 5/2009 | Zhang et al. | 375/260 |
| 2011/0116531 | A1* | 5/2011 | Gore et al. | 375/213 |

OTHER PUBLICATIONS

Haensler et al. "Acoustic Echo and Noise Control", 2004, pp. 349-361.

Ortega et al. "Cabin Car Communication System to Improve Communications Inside a Car", 2002 IEEE International Conference on Acoustics, Speech, and Signal Processing, vol. 4, May 13, 2002, pp. IV-3836.

Martin et al. "Bia Compensation Methods for Minimum Statistics Noise Power Spectral Density Estimation", Signal Processing, vol. 86, No. 6, Jun. 1, 2006, pp. 1215-1229.

* cited by examiner

*Primary Examiner* — Hai Phan

(74) *Attorney, Agent, or Firm* — O'Shea Getz P.C.

(57) ABSTRACT

A system for estimating the background noise in a loudspeaker-room-microphone system is presented herein where the loudspeaker is supplied with a source signal and the microphone picks up the source signal distorted by the room and provides a distorted signal. The system comprises an adaptive filter receiving the source signal and the distorted signal, and providing an error signal, a post filter connected downstream of the adaptive filter and a smoothing filter arrangement connected downstream of the adaptive filter. The smoothing filter arrangement includes a spectral domain smoothing filter that provides a spectral domain estimated-noise signal, and a time domain smoothing filter that provides a time domain estimated-noise signal. A scaling factor calculation unit receives signals indicative of the spectral domain estimated noise signal and the time domain estimated noise signal provides a scaling factor to a scaling unit that applies the scaling factor to the spectral domain estimated-noise signal to provide an enhanced spectral domain estimated-noise signal.

13 Claims, 3 Drawing Sheets

BACKGROUND NOISE ESTIMATION UTILIZING TIME DOMAIN AND SPECTRAL DOMAIN SMOOTHING FILTERING

CLAIM OF PRIORITY

This patent application claims priority from European Patent Application No. 09 155 895.7 filed on Mar. 23, 2009, which is hereby incorporated by reference in its entirety.

FIELD OF TECHNOLOGY

The invention relates to estimating background audio noise, and in particular to estimating the power spectral density of background audio noise.

RELATED ART

Sound waves that do not contribute to the information content of a receiver are generally referred to as background noise. The evolution process of background noise can be classified in three different stages. These are the emission of the noise by one or more sources, the transfer of the noise, and the reception of the noise. Ideally the noise signal is suppressed at the source of the noise itself, and subsequently by repressing the transfer of the signal. However, the emission of noise signals cannot be reduced to the desired level in many cases because, for example, the sources of ambient noise that occur spontaneously in regard to time and location are difficult to control.

Generally, the term "background noise" used in such cases includes all sounds that are not desired. Whenever music or voice signals are transmitted through an electro-acoustic system in a noisy environment, such as in the interior of an automobile, the quality or comprehensibility of these desired signals usually deteriorate due to the background noise. In order to reduce noise signals caused by background noise, and thus improve the subjective quality and comprehensibility of the voice signal being transferred, noise reduction systems are implemented. Known systems operate preferably in the spectral domain on the basis of the estimated power spectrum of the noise signal. The disadvantage of this approach is that if a voice signal occurs at the same time, its spectral information is initially included in the estimate of the power spectral density of the background noise. As a result, not only is the background noise signal reduced as desired in the subsequent filtering circuit, but the voice signal is also reduced, which is undesirable. To prevent this, known methods, such as voice detection, are employed to avoid an unwanted reduction in the voice signal. However, the implementation outlay for such methods is unattractively high.

There is a need to estimate the power spectral density of background noise to allow responding to changes in the level of the background noise.

SUMMARY OF THE INVENTION

A system for estimating the background noise in a loudspeaker-room-microphone system includes the loudspeaker that is supplied with a source signal and the microphone that senses the source signal distorted by the room and provides a distorted signal. The system comprises an adaptive filter that receives the source signal and the distorted signal, and provides an error signal. The system also includes a post filter that receives the error signal, and a smoothing filter that receives a signal indicative of the output of the post filter. The smoothing arrangement may include a first smoothing filter that operates in the spectral domain, and provides an estimated-noise signal in the spectral domain representing the estimated power spectral density of the background noise present in the room, and a second smoothing filter that operates in the time domain, and provides an estimated-noise signal in the time domain representing the power spectral density of the estimated background noise present in the room. A scaling factor calculation unit is connected downstream of the two smoothing filters and provides a scaling factor to a scaling unit that receives the scaling factor from the scaling factor calculation unit. The scaling unit applies the scaling factor to the estimated-noise signal in the spectral domain to provide an enhanced estimated-noise signal in the spectral domain.

DESCRIPTION OF THE DRAWINGS

The invention can be better understood with reference to the following drawings and description. The components in the Figures are not necessarily to scale, instead emphasis being placed upon illustrating the principles of the invention. Moreover, in the figures, like reference numerals designate corresponding parts. In the drawings.

DETAILED DESCRIPTION

By using adaptive filters, a required impulse response (corresponding to the transfer function) of an unknown system can be accurately approximated. Adaptive filters are digital filters which adapt their filter coefficients to an input signal in accordance with a predetermined algorithm. Adaptive methods have the advantage that due to the continuous change in filter coefficients, the algorithms automatically adapt to changing environmental conditions, for example, to interfering noises changing with time which are subjected to temporal changes in their sound level and their spectral composition. This capability is achieved by a recursive system structure that optimizes the parameters.

Figure 1:
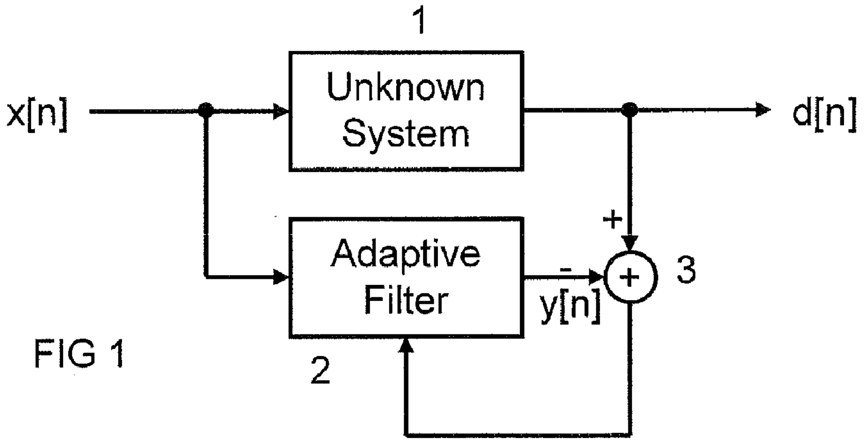
FIG. 1 is a block diagram illustration of an unknown dynamic system that is modeled using an adaptive filter.

FIG. 1 illustrates the principle of adaptive filters. An unknown system 1 is assumed to be a linear, distorting system, the transfer function of which is unknown. This unknown system 1 can be, for example, the passenger compartment of a motor vehicle in which a signal, for example voice and/or music is radiated by one or more loudspeakers, filtered via the unknown transfer function of the passenger compartment and picked up by a microphone in the compartment. Such a system is often called a loudspeaker-room microphone system (LRM system). To find the initially unknown transfer function of the passenger space, an adaptive filter 2 is connected in parallel with the unknown system 1.

With reference to FIG. 1, a source signal x[n] is input to the unknown system 1 and is distorted by the unknown system due to its transfer function, resulting in a distorted signal d[n]. From this distorted signal d[n], an output signal y[n] of the adaptive filter 2 is subtracted by a subtractor 3 to provide an error signal e[n]. The filter coefficients of the adaptive filter are set by iteration, for example, by the least mean square (LMS) method such that the error signal e[n] becomes as small as possible, as a result of which signal y[n] approximates signal d[n]. Thus, the unknown system 1, and thus also its transfer function, are approximated by the adaptive filter 2.

The LMS algorithm is based on the so-called method of steepest descent (gradient descent method) that estimates a gradient in a simple manner. The algorithm operates time-recursively, i.e., with each new record, the algorithm is run again and the solution is updated. Due to its relative simplicity, its numeric stability and the small memory requirement, the LMS algorithm is well suited for adaptive filters and adaptive control systems. Other methods may be, for example, the following algorithm: recursive least squares, QR decomposition least squares, least squares lattice, QR decomposition lattice or gradient adaptive lattice, zero-forcing, stochastic gradient and so on.

Adaptive filters commonly are infinite impulse response (IIR) filters or finite impulse response (FIR) filters. FIR filters have a finite impulse response and operate in discrete time steps that are usually determined by the sampling frequency of an analog signal. An N-th order FIR filter can be described by the following equation:

$$y[n] = b_0 \cdot x[n] + b_1 \cdot x[n-1] + b_2 \cdot x[n-2] + \ldots + b_{N-1} \cdot x[n-N-1]$$
$$= \sum_{i=0}^{N-1} bi \cdot x[n-i]$$

where y(n) is the initial value at (discrete) time n and is calculated from the sum, weighted with the filter coefficients $b_i$, of the N last sampled input values x[n−N−1] to x[n]. By modifying the filter coefficients $b_i$, the transfer function to be approximated is obtained as described above, for example.

In contrast to FIR filters, initial values already calculated are also included in the calculation of IIR filters (recursive filters) that have an infinite impulse response. However, since the calculated values are small after a finite time, the calculation can be terminated after a finite number of samples n, in practice. The calculation rule for an IIR filter is:

$$y[n] = \sum_{i=0}^{N-1} b_i \cdot x[n-i] - \sum_{i=0}^{M-1} a_i \cdot y[n-i]$$

wherein y[n] is the initial value at time n and is calculated from the sum, weighted with the filter coefficients $b_i$, of the sampled input values x[n] added to the sum, weighted with the filter coefficients $a_i$, of the initial values y[n]. The required transfer function is again determined by the filter coefficients $a_i$ and $b_i$. In contrast to FIR filters, IIR filters can be unstable but have a higher selectivity with the same expenditure for implementation. In practice, the filter is chosen which best meets the necessary conditions, taking into consideration the requirements and the associated computing effort.

Figure 2:
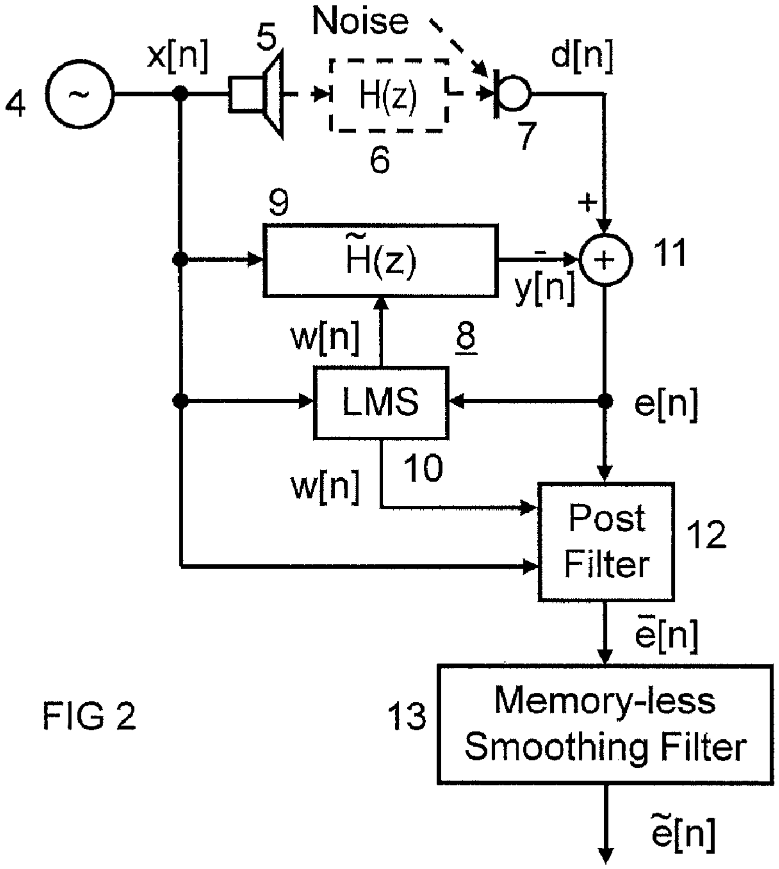
FIG. 2 is a block diagram illustration of a system employing a memory less smoothing filter.

FIG. 2 is a block diagram illustration of a system for estimating background noise with suppression of impulsive interferers such as, e.g., voice or music. The system of FIG. 2 comprises a signal source 4, a loudspeaker 5, a room 6 and a microphone 7 that form a loudspeaker-room-microphone (LRM) system. The room 6 has a transfer function H(z) that describes the filtering of signals travelling from the loudspeaker 5 to the microphone 7. Real applications, such as interior communication systems for providing music- and/or voice signals, can comprise a plurality of loudspeakers and loudspeaker arrays at varied positions in a room such as, e.g., the passenger space of a car where loudspeakers and loudspeaker arrays are often used for different frequency ranges (for example sub-woofer, woofer, medium-range speakers and tweeters, etc.).

The system of FIG. 2 also includes an adaptive filter 8 for approximating the transfer function H(z) of the LRM system. The adaptive filter 8 includes a controllable filter unit 9 having coefficients representing a transfer function $\tilde{H}(z)$, a control unit 10 for adapting the coefficients according to the least-mean-square (LMS) method, and a subtractor 11 for forming the difference between the output signal of the microphone 7 and the output signal of the controllable filter unit 9. The system of FIG. 2 also includes a post filter 12 and a memory-less smoothing filter 13.

A memory-less filter is a digital filter whose output, at a point in time $n_0$, depends solely on the input, applied at this point in time $n_0$. For example, a filter with a gain k is a memory-less filter because if the input is u[n], then the output is $v[n_0]=k \cdot u[n_0]$ for any $n_0$. Most known digital filters, however, are not memory-less filters, i.e., the output $v[n_0]$ depends not only on the current input $u[n_0]$ but also on the input applied before $n_0$. Digital smoothing filters use algorithms for time-series processing that reduce abrupt changes in the time-series and, accordingly, reduce the power of higher frequencies in the spectrum and preserve the power of lower frequencies. A post filter employed in connection with adaptive filters improves the performance of the adaptive filter. A post-filter 12 may be, e.g., an adaptive feedback equalizer type filter of a certain length.

The signal source 4 supplies the loudspeaker 5 with a source signal x[n]. The adaptive filter 8, in particular its controllable filter unit 9 and its control unit 10, and the post filter 12 also receive the source signal x[n]. The microphone 7 provides an output signal d[n] which is the sum of the source signal x[n] filtered with the transfer function H[z] of the LRM space, and background noise (noise) present in the room 6. From the source signal x[n], the adaptive filter 8 provides the signal y[n] which is subtracted from the distorted signal d[n] by the subtractor 11 to supply an error signal e[n].

The current filter coefficient set w[n] of the adaptive filter 8 is created from the source signal x[n] and the error signal e[n] by the LMS algorithm. Since the adaptive filter ideally approximates the transfer function H(z) of the LRM space with respect to the source signal x[n], the error signal e[n] represents a measure of the background noise (noise), e.g., in the interior of the motor vehicle.

Since interior communication systems in modern motor vehicles are typically complex and multichannel arrangements with a plurality of loudspeakers, as stated above, no complete or adequate suppression of the music and/or voice signals, i.e., the source signal x[n], for the estimation of the background noise can be achieved by the adaptive filter 8 alone, which may be, for example, a stereo echo canceller. One of the reasons for this may be that with a plurality of loudspeakers mounted at different positions in the interior results in a corresponding plurality of different transfer functions H(z) between the respective loudspeakers and the microphone.

Therefore, a further adaptive filter, the post filter 12, is connected to the adaptive filter 8. The post filter 12 receives the error signal e[n], the current filter coefficient set of the adaptive filter w[n], and the source signal x[n]. The adaptive post filter 12 adaptive filters the error signal e[n] to provide a filtered error signal $\bar{e}$[n] which now exhibits an improved suppression of music signals for estimating the background noise. The post filter 12 only filters the input signal e[n] when the adaptive filter 8 has not yet completely adapted and/or if the source signal x[n] reaches high levels. The filtered error signal $\bar{e}[n]$ of the post filter 12 is then converted via the memory-less smoothing filter 13 into a signal $\tilde{e}[n]$ which represents the ultimate measure of the estimated background noise. The memory-less smoothing filter 13 suppresses impulse-like and unwanted disturbances when estimating the background noise. Such unwanted disturbances are, e.g., produced by voice signals which comprise a wide dynamic range.

Figure 3:
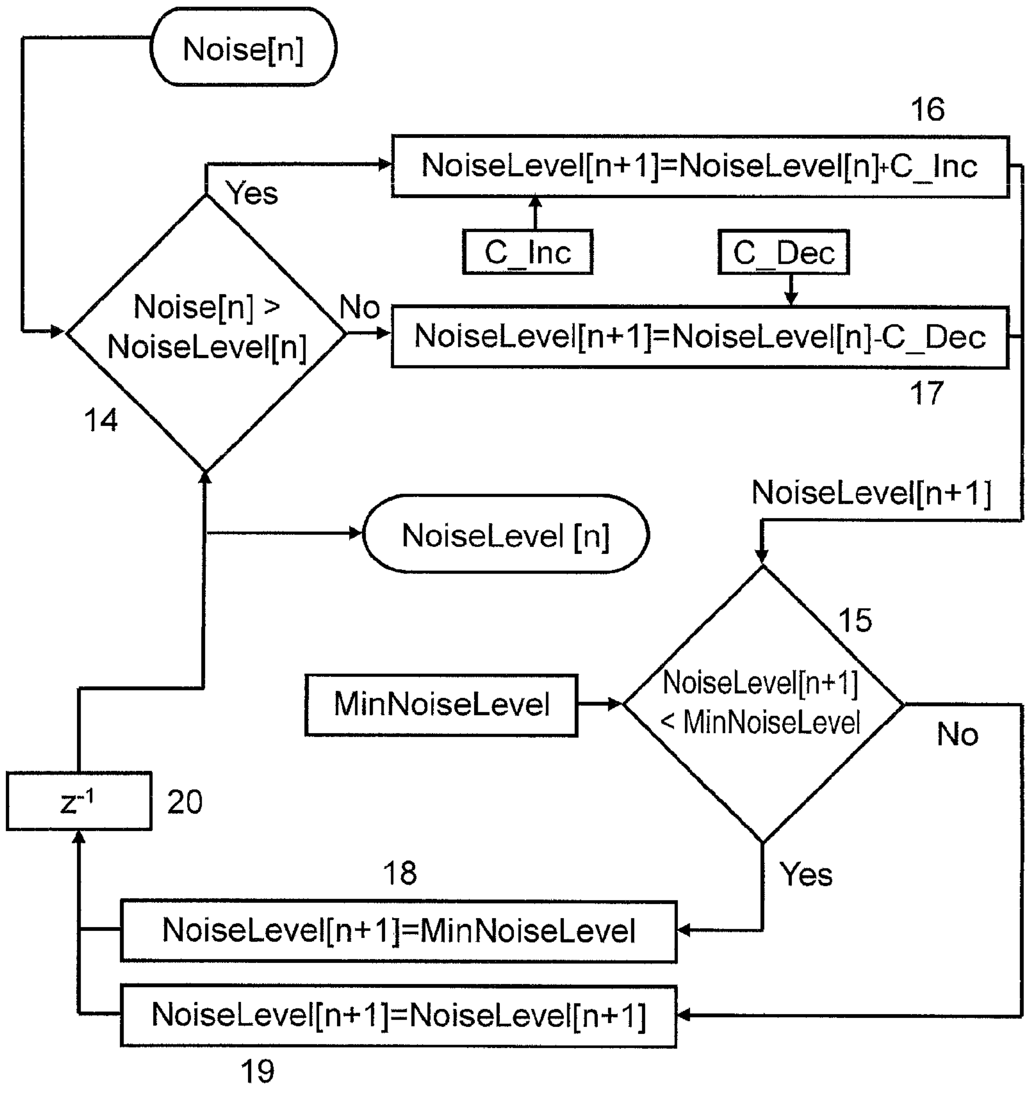
FIG. 3 is a flow chart illustration of a process for estimating the background noise having a one-channel smoothing arrangement.

FIG. 3 is a flow chart illustration of an algorithm in a digital signal processor, for estimating the power spectral density employing a smoothing filter as described above with reference to FIG. 2. This method makes use of the fact that the variation with time of the level of voice signals typically differs distinctly from the variation of the level of background noise, particularly due to the fact that the dynamic range of the level change of voice signals is greater and occurs in much briefer intervals than the level change of background noise. Known algorithms, therefore, use constant and permanently predetermined increments or decrements, which are small in comparison with the dynamic range of levels of voice and/or music signals, in order to approximate the estimated power spectral density of the background noise with the actual level of the power spectral density in the case of level changes in the background noise. As a result, the level changes of a voice and/or music signal which, by comparison, occur within very short intervals, have the least possible corrupting influence on the estimation of the power spectral density of the background noise.

Referring to FIG. 3, the memory-less smoothing filter 13 comprises a first comparator 14, a second comparator 15, a first calculating unit 16 for calculating the increase in estimation of the power spectral density and a second calculating unit 17 for calculating the decrease in estimation of the power spectral density. The memory-less smoothing filter 13 also includes a third calculating unit 18 for setting the signal NoiseLevel[n+1] to MinNoiseLevel and a path 19 for transmitting the signal NoiseLevel[n+1] unchanged. The current noise value Noise[n] which can be the signal of a microphone measuring the background noise or the error signal of an adaptive filter is compared in the first comparator 14 with the estimated noise level value NoiseLevel[n], determined in the preceding step of the algorithm, of the estimated power spectral density. If the current noise value Noise[n] is greater than the estimated noise level NoiseLevel[n], ("Yes" path of the first comparator 14), determined in the preceding step of the algorithm, a increment C_Inc (e.g., permanently preset) is added to the estimated noise level value NoiseLevel[n] determined in the preceding step of the algorithm, which results in a new, higher noise level value NoiseLevel[n+1] for the estimation of the power spectral density.

The increment C_Inc may be constant and its magnitude independent of the amount that the current noise value Noise [n] is greater than the estimated noise level value NoiseLevel [n] determined in the preceding step. This avoids any voice signals which may also be present in the current noise value Noise[n] and which may be impulse disturbances which typically have much faster level increases than the wideband background noise, having significant effects on the algorithm and thus the calculation of the estimated value.

If, in contrast, the current noise value Noise[n] in the first comparator 14 is lower than the estimated noise level value NoiseLevel[n], determined in the preceding step of the algorithm ("No" path of the comparator 14), a decrement C_Dec (e.g., permanently preset) is subtracted from the estimated noise level value NoiseLevel[n] determined in the preceding step of the algorithm which results in a new lower noise level value NoiseLevel[n+1] for the estimation of the power spectral density.

The decrement C_Dec may be constant and its magnitude independent of the amount by which the current noise value Noise[n] is smaller than the estimated noise level value NoiseLevel[n] determined in the preceding step. As a consequence, differences in the rate of the level change of the current noise value Noise[n] remain unconsidered both for the incrementing and for the decrementing, respectively, of the estimated value. The newly calculated estimated noise level value NoiseLevel[n+1] is compared with a permanently preset minimum value MinNoiseLevel in the second comparator 15.

In the case where the newly calculated estimated noise level value NoiseLevel[n+1] is smaller than the permanently preset minimum value MinNoiseLevel ("Yes" path of the second comparator 15), the value of the newly calculated estimated noise level value NoiseLevel[n+1] is replaced, i.e., raised to the minimum value MinNoiseLevel, by the value of the permanently preset minimum value MinNoiseLevel. The result of this permanently preset lower threshold value MinNoiseLevel is that the noise level value NoiseLevel[n+1] does not drop below the predetermined threshold value even when the values of the noise value Noise[n] are actually lower. The result is that the algorithm does not respond too inertly even when the noise value Noise[n] subsequently rises quickly and strongly.

Since the maximum possible rate of increase of the estimated value of the power spectral density is predetermined by the value C_Inc of the increment, quick and strong increases in the noise value Noise[n] which distinctly exceed the value C_Inc of the increment per unit time of the pass of the algorithm for recalculation can result in much too great a distance between the newly calculated estimated noise level value NoiseLevel[n+1] and the actual noise value Noise[n], as a result of which the correction of the estimated noise level value NoiseLevel[n+1] to the actual noise value Noise[n] of the power spectral density can assume periods of time which do not enable the estimated value thus calculated to be meaningfully evaluated and used further. If, in contrast, the newly calculated estimated noise level value NoiseLevel[n+1] is greater than the permanently preset minimum value MinNoiseLevel ("No" path of the second comparator 15), this newly calculated estimated noise level value NoiseLevel[n+1] is retained and the algorithm begins to calculate the next value of the estimation of the power spectral density.

The post filter 12 shown in FIG. 2 is implemented in the spectral domain and, therefore, during the filtering only responds to the spectral ranges in which the source signal x[n] has a distinctly different energy at a particular point in time than the error signal e[n]. This leads to the error signal e[n] being distinctly decreased or increased in the corresponding spectral ranges by the filtering in the post filter 12. This decreasing and increasing of the error signal e[n] follows the dynamic change in the source signal x[n].

Since the signal x[n] of the signal source may be a music signal, the corresponding filtering at the spectral ranges concerned follows the variation of this music signal, for example, its rhythm. These changes in the output signal $\bar{e}[n]$ of the post filter 12 which, of course, is intended to represent a measure of the estimation of the typically quasi-steady-state background noise as desired, lead to a corresponding modulation of the signal $\bar{e}[n]$ for estimating the background noise and, as a result, the measured energy of the background noise, considered in the temporal mean, is not corrupted, or only very slightly so. However, the output signal $\bar{e}[n]$ of the adaptive post filter 12 now has characteristics and features of impulse-like interference signals which are suppressed by the downstream memory-less smoothing filter 13. However, this results in a faulty estimation of the background noise (signal $\tilde{e}[n]$) which, in particular, results in too low a level for the estimated background noise due to the smoothing and the typical variation of music signals with impulse-like level increases.

The present method and system prevent, or at least reduce, the errors in the estimation of the background noise (noise) in an LRM system, as a result of which an improvement in the subjective quality and the intelligibility of the voice signal to be transmitted and/or the music signals to be transmitted, is achieved.

A further improvement is achieved by performing an estimation of the background noise both in the spectral domain and in the time domain to avoid faulty and unwanted level estimations of the background noise. Two separate memory-less smoothing filters may be used, one of the two memory-less smoothing filters operating in the spectral domain and a second memory-less smoothing filter operating in the time domain.

As set forth above with reference to FIG. 2, the adaptive post filter 12 is advantageous, particularly in multi-channel interior communication systems, in order to achieve sufficient echo cancellation for estimating the background noise. Furthermore, the operation of the adaptive post filter 12 considered over time, does not cause the measured energy of the background noise (signal $\bar{e}[n]$ in the system of FIG. 2) to be corrupted, or only very slightly so. However, the ultimately faulty estimation of the energy of the background noise (signal $\tilde{e}[n]$ in the system of FIG. 2) is essentially produced by the initially desired suppression or smoothing, respectively, of impulse-like signal components in the signal $\tilde{e}[n]$ (output of the post filter). These impulse-like signal components in the signal $\bar{e}[n]$ are the result of the typical level variation of music signals and the smoothing by the downstream smoothing filter implemented in the spectral domain leads on average to energy of the background noise which is estimated at too low a level.

Figure 4:
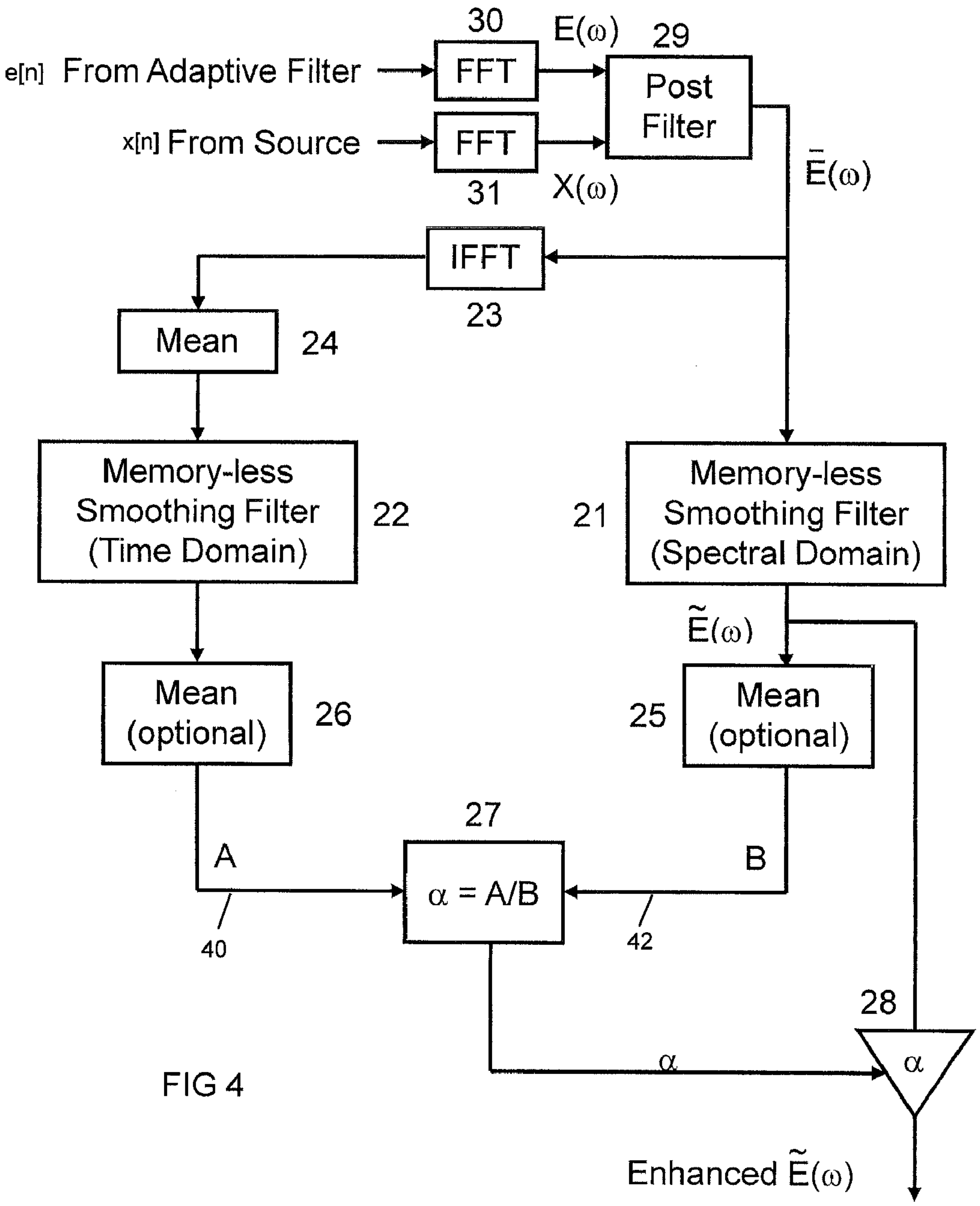
FIG. 4 is a block diagram illustration of a system for estimating the background noise having a two-channel smoothing arrangement.

FIG. 4 is a block diagram illustration of a system for estimating the background noise, and is an improvement of the system illustrated in FIG. 2. The system of FIG. 4 includes an adaptive post filter 29 operated in the spectral domain via Fast Fourier Transformation (FFT) units 30, 31. The post filter 29 provides an output signal $\bar{E}(\omega)$ in the spectral domain from input signals $E(\omega)$ and $X(\omega)$ in the spectral domain. $E(\omega)$ designates the error signal of the upstream adaptive filter (not shown here for ease of illustration) for approximating the transfer function $H(z)$ of the LRM space in the spectral domain and $X(\omega)$ designates the signal of the signal source (again not shown here for ease of illustration) in the spectral domain. The FFT units 30, 31 transform the error signal $e[n]$ and the current filter coefficient set of the adaptive filter $w[n]$ from the time domain into the spectral domain.

Referring still to FIG. 4, the system includes a frequency domain memory-less smoothing filter 21 and a time domain memory-less smoothing filter 22, which results in a two-channel filtering of the output signal $\bar{E}(\omega)$ of the upstream post filter 29. An Inverse Fast Fourier Transformation (IFFT) unit 23 and a mean calculation unit 24 are connected upstream of the time domain smoothing filter 22. The IFFT unit 23 transforms the output signal $\bar{E}(\omega)$ from the spectral domain into the time domain. The mean calculation unit 24 as well as two mean calculation units 23 connected downstream of the smoothing filters 21, 22, respectively, calculate the mean of the respective input signals. The system of FIG. 4 also includes a unit 27 for forming the quotient of two signals A and B (A/B) connected upstream of the two mean calculation units 25, 26 and a controllable amplifier 28 having a variable gain.

The output signal $\bar{E}(\omega)$ of the post filter 29 is changed into the signal $\bar{E}(\omega)$ by the spectral domain memory-less smoothing filter 21. This corresponds to the filtering of the signal $\bar{e}[n]$ according to FIG. 2 which is changed into the signal $\tilde{e}[n]$ by the memory-less smoothing filter 12. The output signal $\bar{E}(\omega)$ is changed by the IFFT unit 23, into a signal in the time domain from which the mean is formed by the mean calculation unit 24. The mean of this signal, which is now present in the time domain, is used as the input signal of the time domain memory-less smoothing filter 22. This time domain memory-less smoothing filter 22 exhibits the same wideband filter characteristic as the spectral domain memory-less smoothing filter 21. Due to the fact that the time domain memory-less smoothing filter 22 is implemented in the time domain, this filter leads to an output signal, the wideband level of which, in contrast to the level of the memory-less smoothing filter implemented in the spectral domain, is not subjected to unwanted level reduction with respect to the estimated background noise (but still comprises the unwanted level modulation in the spectral domain, described above, and, therefore is not directly suitable as a measure for estimating the power spectral density of the background noise).

The output signal of the time domain wideband memory-less smoothing filter 22 averaged by the mean calculation unit 26, which results in a signal A on line 40. The output signal of the spectral domain wideband memory-less smoothing filter may be averaged by the mean calculation unit 25, which results in a signal B on line 42. The quotient $\alpha$ is formed from these two signals A and B by unit 27, which calculates $\alpha=A/B$. The quotient $\alpha$ represents the ratio between the correct wideband level estimation (signal A) of the background noise by the memory-less smoothing filter implemented in the time domain and the level, which is corrupted as described above and, as a rule, is estimated at too low a level, of the background noise (signal B), which is produced by the spectral domain memory-less smoothing filter.

Referring still to FIG. 4, the output of the spectral domain wideband memory-less smoothing filter is connected to the input of a scaling unit 28 such as, e.g., a controllable amplifier or a multiplier, as a result of which the signal $\tilde{E}(\omega)$, which is corrupted with respect to its level estimation, is applied to the input of the scaling unit 28. According to FIG. 4, the scaling factor (gain) of the scaling unit 28 is controlled via the variable formed as the quotient from the signals A and B, as a result of which the level-corrected enhanced $\tilde{E}(\omega)$ signal is obtained at the output of the scaling unit 28, which signal is still subjected to the desired smoothing in the spectral domain as before (see FIG. 2) but, at the same time, is corrected in its estimated level by the gain factor $\alpha=A/B$. Thus, variations caused in the spectral domain by the adaptive post filter and the smoothing filter together are reduced and a suppression of impulse interference signals achieved.

Advantages can be obtained if the time domain memory-less smoothing filter has the same wideband filter characteristic as the spectral domain memory-less smoothing filter and/or if the difference formed from the levels of the background noise estimated by the two memory-less smoothing filters is used for determining a scaling factor that scales the output signal of the spectral domain smoothing filter.

Although various examples to realize the invention have been disclosed, it will be apparent to those skilled in the art that various changes and modifications can be made which will achieve some of the advantages of the invention without de-parting from the spirit and scope of the invention. It will be obvious to those skilled in the art that other components performing the same functions may be suitably substituted. Such modifications are intended to be covered by the appended claims.

What is claimed is:

1. A system for estimating the background noise in a loud-speaker-room-microphone system, where a loudspeaker is supplied with a source signal and a microphone senses the source signal distorted by the room and provides a distorted signal, the system comprises:

an adaptive filter that receives the source signal and the distorted signal, and provides an estimated signal;

a difference unit that provides an error signal indicative of the difference between the estimated signal and the distorted signal;

a post filter that receives and filters a signal indicative of the error signal and provides a post filtered error signal;

a spectral domain smoothing filter that receives the post filtered error signal and provides a spectral domain estimated-noise signal representing the estimated power spectral density of the background noise present in the room;

a time domain smoothing filter that receives a first signal indicative of the post filtered error signal and provides a time domain estimated-noise signal representing the estimated mean power of the estimated background noise present in the room;

a scaling factor calculation unit that receives a second signal indicative of the time domain estimated-noise signal and a third signal indicative of the spectral domain estimated-noise signal and provides a scaling factor; and a scaling unit that receives the scaling factor and applies the scaling factor to the spectral domain estimated-noise signal to provide an enhanced estimated-noise signal.

2. The system of claim 1, where at least one of the smoothing filters comprises a memory-less filter.

3. The system of claim 2, where the scaling factor calculation unit divides the time domain estimated-noise signal by the spectral domain estimated-noise signal to generate the scaling factor.

4. The system of claim 1, further comprising an inverse Fourier transform unit that receives the post filtered signal error and provides a time domain post filtered error signal to a first mean calculation unit that provides the first signal.

5. The system of claim 4, further comprising a second mean calculation unit connected downstream of the time domain smoothing filter to provide the second signal and third mean calculation unit connected downstream of the spectral domain smoothing filter to provide the third signal.

6. The system of claim 2, where the spectral domain smoothing filter has a wideband filter characteristic equal to the time domain smoothing filter.

7. The system of claim 2, where the post filter operates in the spectral domain and an inverse spectral transformation unit is connected between the post filter and the time domain smoothing filter.

8. A method for estimating the background noise in a loudspeaker-room-microphone system, where a loudspeaker is supplied with a source signal and a microphone picks up the source signal distorted by the room and provides a distorted signal; the method comprises the steps of:

adaptive filtering of the source signal to provide an estimated signal;

providing an error signal indicative of the difference between the distorted signal and the estimated signal;

post filtering a first signal indicative of the error signal to provide a post filtered error signal;

spectral domain filtering a second signal indicative of the post filtered error signal to provide a spectral domain estimated-noise signal representing the estimated power spectral density of the background noise present in the room;

time domain filtering a third signal indicative of the post filtered error signal to provide a time domain estimated-noise signal representing the estimated mean power of the background noise present in the room;

calculating a scaling factor from the spectral domain estimated-noise signal and the time domain estimated-noise signal; and scaling the spectral domain estimated-noise signal according to the scaling factor;

where the scaling factor is applied to the spectral domain estimated-noise signal to provide an enhanced spectral domain estimated-noise signal.

9. The method of claim 8, where at least one of the domain filtering steps is performed by a memory-less filter.

10. The method of claim 8, where the step of calculating the scaling factor comprises dividing the power of the timv domain estimated-noise signal by the power of the spectral domain estimated-noise signal to generate the scaling factor.

11. The method of claim 8, further comprising time domain transforming the post filtered error signal and providing a time domain post filtered error signal to a first mean calculation unit that provides the third signal.

12. The method of claim 11, further calculating a mean of a fourth signal from the spectral domain smoothing filter to provide the spectral domain estimated-noise signal and calculating a mean of a fifth signal from the time domain smoothing filter to provide the time domain estimated-noise signal.

13. The method of claim 8, where the step of spectral domain filtering and the step of time domain filtering employ equal wideband filter characteristics.

* * * * *